United States Patent Office.

ELLIOTT H. CRANE, OF BURR OAK, MICHIGAN.

Letters Patent No. 81,755, dated September 1, 1868.

IMPROVED COMPOUND FOR EMBALMING DEAD BODIES.

The Schedule referred to in these Letters Patent and making part of the same.

TO ALL WHOM IT MAY CONCERN:

Be it known that I, ELLIOTT H. CRANE, of the city of Burr Oak, and county of St. Joseph, and State of Michigan, have originated and discovered a new and useful Compound for the Preservation of the Dead.

This wonderful compound may be applied to the throat, mouth, and cavity from which the intestines have been removed, in dry powder, thereby embalming and mummifying the flesh.

It is also susceptible of being made into alcoholic or aqueous solutions, and injected through the arterial courses, or otherwise applied to the subject, with the same preservative effect.

This compound also preserves fatty matter, and hardens the fluids of the flesh.

This process can be used for taxidermic purposes, with great advantage to the naturalist, on account of perfectly preserving the form of birds, animals, and insects, together with being a powerful disinfectant, thus doing away with the trouble of skinning the subject that has commenced to spoil. Hence, specimens can be saved by this process that must otherwise have been lost.

The following is a full and clear receipt for the making of said compound, making part of this specification, which I denominate "Elliott H. Crane's Electrodynamic Mummifier:"

Nux vomica, one ounce.
Alum, three pounds.
Chloride of sodium, three ounces.
Muriate of ammonia, one pound one ounce.
Arsenic, nine pounds.
Chloride of mercury, two pounds.
Camphor, one pound.
Chloride of zinc, one pound four ounces.

The above chemicals should all be pulverized separately, then mixed, and kept in glass-stopped jars.

This compound hardens the fluids of the flesh, and suddenly arrests putridity, when compounded and applied substantially in the manner specified.

What I claim as new, and wish to secure by Letters Patent, is—

The discovery, application, and use of an embalming and mummifying-compound for the preservation of the dead, and for taxidermic purposes, as prepared, compounded, and applied, substantially in the manner specified and described.

I also claim the application of this compound, in dry powder, to the mouth, throat, and other natural apertures of the subject, substantially as specified and described.

ELLIOTT H. CRANE.

Witnesses:
F. G. CLAYTON,
A. R. ALLEN.